US012632762B2

(12) United States Patent
Kim et al.

(10) Patent No.: US 12,632,762 B2
(45) Date of Patent: May 19, 2026

(54) METHOD AND APPARATUS FOR PROCESSING AND MEASURING PHOTONIC QUBIT SIGNALS

(71) Applicant: ELECTRONICS AND TELECOMMUNICATIONS RESEARCH INSTITUTE, Daejeon (KR)

(72) Inventors: Min Su Kim, Daejeon (KR); In Gyoo Kim, Daejeon (KR); Ki Won Moon, Daejeon (KR); Jeong Ho Bang, Daejeon (KR); Kyung Hyun Baek, Daejeon (KR); Jung Jin Ju, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 596 days.

(21) Appl. No.: 18/105,080

(22) Filed: Feb. 2, 2023

(65) Prior Publication Data

US 2023/0252333 A1 Aug. 10, 2023

(30) Foreign Application Priority Data

Feb. 4, 2022 (KR) ........................ 10-2022-0014780
Nov. 24, 2022 (KR) ........................ 10-2022-0159278

(51) Int. Cl.
*G06N 10/40* (2022.01)

(52) U.S. Cl.
CPC ................................... *G06N 10/40* (2022.01)

(58) Field of Classification Search
CPC ........ G06N 10/00; G06N 10/20; G06N 10/40; G06N 10/60; G06N 10/70; G06N 10/80; G06F 30/30; G06F 30/35; G06F 30/3312
(Continued)

(56) References Cited

U.S. PATENT DOCUMENTS 10,171,088 B1 1/2019 Kim et al.
2019/0244128 A1 8/2019 Choi et al.
(Continued)

FOREIGN PATENT DOCUMENTS

KR 10-2018-0006883 A 1/2018
KR 10-2263313 B1 6/2021
KR 10-2021-0114234 A 9/2021

OTHER PUBLICATIONS

Felix Bussieres et al., "Manipulating time-bin qubits with fiber optics components", 2006 IEEE.
(Continued)

*Primary Examiner* — Paul Dinh
(74) *Attorney, Agent, or Firm* — LRK PATENT LAW FIRM

(57) ABSTRACT

An apparatus for processing a photonic qubit signal includes a first optical unit to receive and transmit a time-modulated signal divided into two sections distinguished with respect to time and correspond to |0⟩ and |1⟩ states of single-photon qubit information; a second optical unit to form a first path-signal pattern by distributing the time-modulated signal into two spatial paths; a third optical unit to form a second path-signal pattern from the first path-signal pattern by inducing a relative delay and controlling a phase difference between signals on the two spatial paths; a fourth optical unit to form a third path-signal pattern through optical interference of the second path-signal pattern; and a fifth optical unit to control a phase difference between signals on the two spatial paths and form a fourth path-signal pattern through optical interference of the third path-signal pattern.

19 Claims, 6 Drawing Sheets

(58) Field of Classification Search
USPC ........................................................ 716/100
See application file for complete search history.

(56) References Cited

U.S. PATENT DOCUMENTS

| 2021/0105135 | A1 | | 4/2021 | Figueroa et al. | |
|---|---|---|---|---|---|
| 2023/0214702 | A1 | * | 7/2023 | Dahan ................... | G06N 10/40 |
| | | | | | 716/100 |

OTHER PUBLICATIONS

Connor Kupchak et al., "Time-bin-to-polarization conversion of ultrafast photonic qubits", Physical Review A 96, 053812 (2017).
Office Action of the KR Patent Application No. 10-2022-0159278 dated Jan. 20, 2026.

* cited by examiner $$|\psi\rangle = \alpha|0\rangle + \beta|1\rangle$$
$$\alpha = \cos(\theta/2)$$
$$\beta = e^{i\phi}\sin(\theta/2)$$
$$|\pm\rangle = (|0\rangle \pm |1\rangle)/\sqrt{2}$$
$$|\pm i\rangle = (|0\rangle \pm i|1\rangle)/\sqrt{2}$$

METHOD AND APPARATUS FOR PROCESSING AND MEASURING PHOTONIC QUBIT SIGNALS

CROSS REFERENCE TO RELATED APPLICATIONS

The present application claims priority to Korean patent applications 10-2022-0014780, filed Feb. 4, 2022, and 10-2022-0159278, filed Nov. 24, 2022, the entire contents of which are incorporated herein for all purposes by this reference.

BACKGROUND OF THE INVENTION

1. Field of the Invention

The present disclosure relates to a technique for processing and measuring photonic qubit signals for realizing quantum internet and quantum computers and, more particularly, to an apparatus and a method for processing and measuring a photonic qubit signal, which are capable of soundly manipulating and measuring a quantum superposition feature of a time-bin photonic qubit state.

2. Description of Related Art

Quantum information and communication refers to an overall area of technology for generating, controlling, measuring and analyzing quantum states in order to apply quantum mechanics features to the information and communication technologies. Key areas of quantum information and communication are mainly classified into quantum communication, quantum computing, and quantum sensing and metrology, and in most of the technical areas of quantum information and communication, quantum information states are expressed by a 'qubit' (quantum bit), which is a conceptual extension of bit, that is, a basic unit of information used in the classic information and communication technologies.

SUMMARY

The present disclosure is technically directed to provide a device and a method for processing and measuring a photonic qubit signal which are capable of soundly manipulating and measuring a quantum superposition feature of a time-bin photonic qubit state.

Other objects and advantages of the present invention will become apparent from the description below and will be clearly understood through embodiments. In addition, it will be easily understood that the objects and advantages of the present disclosure may be realized by means of the appended claims and a combination thereof.

According to an embodiment of the present disclosure, there is provided an apparatus for processing a photonic qubit signal. The apparatus comprising: a first optical unit configured to receive and transmit a time-modulated signal divided into two sections which are distinguished with respect to time and correspond respectively to $|0\rangle$ and $|1\rangle$ states of single-photon qubit information; a second optical unit configured to form a first path-signal pattern by distributing the time-modulated signal into two spatial paths; a third optical unit configured to form a second path-signal pattern from the first path-signal pattern by inducing a relative delay with a preset time interval and controlling a phase difference between signals onon the two spatial paths;

a fourth optical unit configured to form a third path-signal pattern through optical interference of the second path-signal pattern; and a fifth optical unit configured to control a phase difference between signals on the two spatial paths and to form a fourth path-signal pattern through optical interference of the third path-signal pattern affected by a control result of the phase difference.

According to the embodiment of the present disclosure, the apparatus further comprising a detection unit configured to analyze the single-photon qubit information by measuring the fourth path-signal pattern.

According to the embodiment of the present disclosure, wherein the second optical unit is implemented by using a Y branch or a directional coupler.

According to the embodiment of the present disclosure, wherein the third optical unit comprises a first optical means that induces a relative delay between signals on the two spatial paths with a preset time interval, and a second optical means that controls a phase change in a signal on at least one spatial path of the two spatial paths, and wherein the first optical means is further configured to induce a time delay by a time interval between the two sections divided temporally in the time-modulated signal.

According to the embodiment of the present disclosure, wherein the second optical means comprises: an optical means 2-1 configured to control a phase change in a signal on a first spatial path of the two spatial paths; and an optical means 2-2 configured to control a phase change in a signal on a second spatial path of the two spatial paths.

According to the embodiment of the present disclosure, wherein the fourth optical unit comprises a first optical interference block in which optical interference occurs between signals on the two spatial paths in the second path-signal pattern.

According to the embodiment of the present disclosure, wherein the fifth optical unit comprises: a third optical means that controls a phase change in a signal on at least one spatial path of the two spatial paths; and a second optical interference block in which optical interference occurs between signals on the two spatial paths in the third path-signal pattern affected by the phase change due to the third optical means.

According to the embodiment of the present disclosure, wherein the third optical means comprises: an optical means 3-1 configured to control a phase change in a signal on a first spatial path of the two spatial paths; and an optical means 3-2 configured to control a phase change in a signal on a second spatial path of the two spatial paths.

According to another embodiment of the present disclosure, there is provided an apparatus for processing a photonic qubit signal. The apparatus comprising: a first optical unit configured to receive and transmit a time-modulated signal divided into two sections which are distinguished with respect to time and correspond respectively to $|0\rangle$ and $|1\rangle$ states of single-photon qubit information; a second optical unit configured to form a first path-signal pattern by distributing the time-modulated signal into two spatial paths; a third optical unit configured to control a phase difference between signals on the two spatial paths within a shorter time than a time interval between the two sections in the time-modulated signal and to form a second path-signal pattern by distributing the two states of the single-photon qubit information, which is divided into each of the two sections in the time-modulated signal, into the two spatial paths respectively, through optical interference of the first path-signal pattern affected by a control result of the phase difference; a fourth optical unit configured to form a third path-signal pattern from the second path-signal pattern by inducing a relative delay with a preset time interval in a spatial path, to which qubit information of a temporally preceding section of the two sections in the time-modulated signal is delivered, and by controlling a phase difference between signals on the two spatial paths; a fifth optical unit configured to form a fourth path-signal pattern through optical interference of the third path-signal pattern; and a sixth optical unit configured to control a phase difference between signals on the two spatial paths and to form a fifth path-signal pattern through optical interference of the fourth path-signal pattern affected by a control result of the phase difference.

According to the another embodiment of the present disclosure, wherein the third optical unit comprises: a first optical means that is provided to at least one spatial path of the two spatial paths and controls a phase difference between signals on the two spatial paths within a shorter time than a time interval between the two sections in the time-modulated signal; and a first optical interference block in which optical interference occurs between signals on each of the two spatial paths in the first path-signal pattern affected by the phase difference control due to the first optical means.

According to yet another embodiment of the present disclosure, a method for processing a photonic qubit signal. The method comprising: receiving a time-modulated signal divided into two sections which are distinguished with respect to time and correspond respectively to $|0\rangle$ and $|1\rangle$ states of single-photon qubit information; forming a first path-signal pattern by distributing the time-modulated signal into two spatial paths; forming a second path-signal pattern from the first path-signal pattern by inducing a relative delay with a preset time interval and controlling a phase difference between signals on the two spatial paths; forming a third path-signal pattern through optical interference of the second path-signal pattern; and controlling a phase difference between signals on the two spatial paths and forming a fourth path-signal pattern through optical interference of the third path-signal pattern affected by a control result of the phase difference.

According to the another embodiment of the present disclosure, wherein the forming of the second path-signal pattern comprises: controlling a phase difference between signals on the two spatial paths within a shorter time than a time interval between the two sections in the time-modulated signal; forming a fifth path-signal pattern by distributing the two states of the single-photon qubit information, which is divided into each of the two sections in the time-modulated signal, into the two spatial paths respectively, through optical interference of the first path-signal pattern affected by a control result of the phase difference; and forming the second path-signal pattern from the fifth path-signal pattern by inducing a relative delay with a preset time interval in a spatial path, to which qubit information of a temporally preceding section of the two sections in the time-modulated signal is delivered, and by controlling a phase difference between signals on the two spatial paths.

The features briefly summarized above with respect to the present disclosure are merely exemplary aspects of the detailed description below of the present disclosure, and do not limit the scope of the present disclosure.

According to the present disclosure, it is possible to provide a device and a method for processing and measuring a photonic qubit signal which are capable of soundly manipulating and measuring a quantum superposition feature of a time-bin photonic qubit state.

Effects obtained in the present disclosure are not limited to the above-mentioned effects, and other effects not mentioned above may be clearly understood by those skilled in the art from the following description.

DETAILED DESCRIPTION

Figure 1:
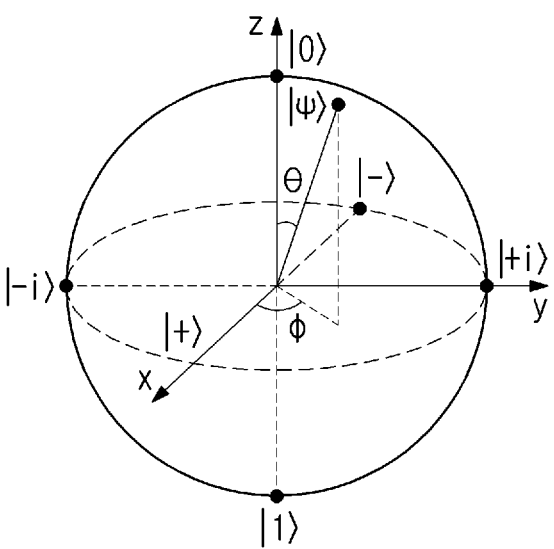
FIG. 1 is an example view for describing a qubit state.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include yet another element unless specifically stated otherwise to exclude yet another component.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an exemplary embodiment is also included in the scope of the present disclosure. In addition, embodiments including other elements in addition to the elements described in the various embodiments are also included in the scope of the present disclosure.

In the present document, such phrases as 'A or B', 'at least one of A and B', 'at least one of A or B', 'A, B or C', 'at least one of A, B and C' and 'at least one of A, B or C' may respectively include any one of items listed together in a corresponding phrase among those phrases or any possible combination thereof.

Unlike a bit, a qubit operates based on the principle of superposition by which a quantum information state can have the quantum states of $|0\rangle$ and $|1\rangle$ on the Bloch sphere of FIG. 1 at the same time. Since this enables a completely new technology and system to be constructed beyond the technical limitations of the classical information and communication technologies, quantum technology attracts a lot of attention as the future information and communication technology and, furthermore, some technological results are already applied to systems and services.

Qubit information may be implemented through various media with quantum features, and representative technological means include superconductors, ion traps, quantum dots, semiconductors, and photons. Among these media, a qubit implementation technology based on photons is highly robust against a change of the external environment, unlike any other technologies, so that it can be realized at normal temperature and pressure, and is easily connected with the established network and system resources of the existing information and communication technology based on optical fiber. Furthermore, the technological flexibility of quantum information encoding, in various schemes like polarization, optical path and time bin, is such a great advantage that the photonic qubit implementation technology is recognized as one of core technology fields for quantum information and communication.

However, the photonic qubit technology has a limitation due to its probabilistic operation in quantum information processing under various conditions for real technical implementations and applications, including transformation between qubit encoding schemes, optical signal processing and measurement, and the like. Since this causes inevitable loss of qubit resources, technological solutions at component and system levels needs to be secured.

Figure 2:
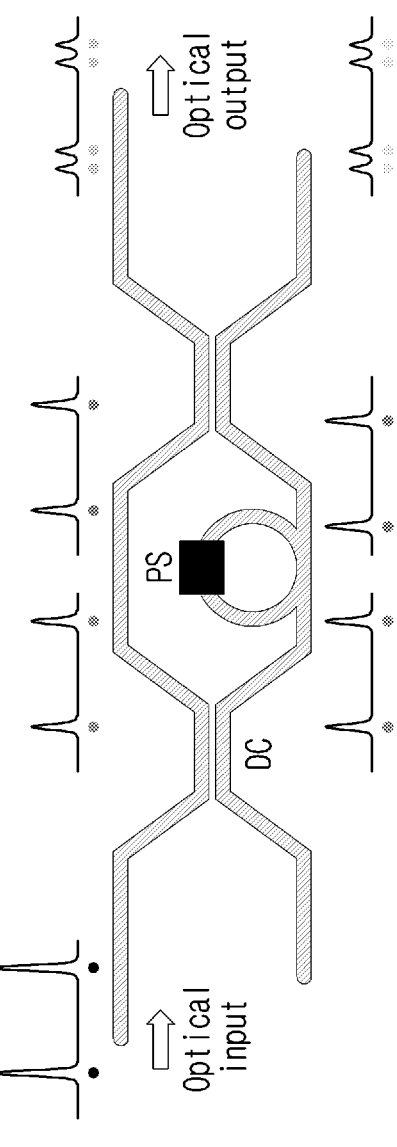
FIG. 2 shows a basic operation structure of a device for encoding a single-photon pulse train generated at a time interval in a time-bin qubit and transmitting the time-bin qubit signal.
Figure 3:
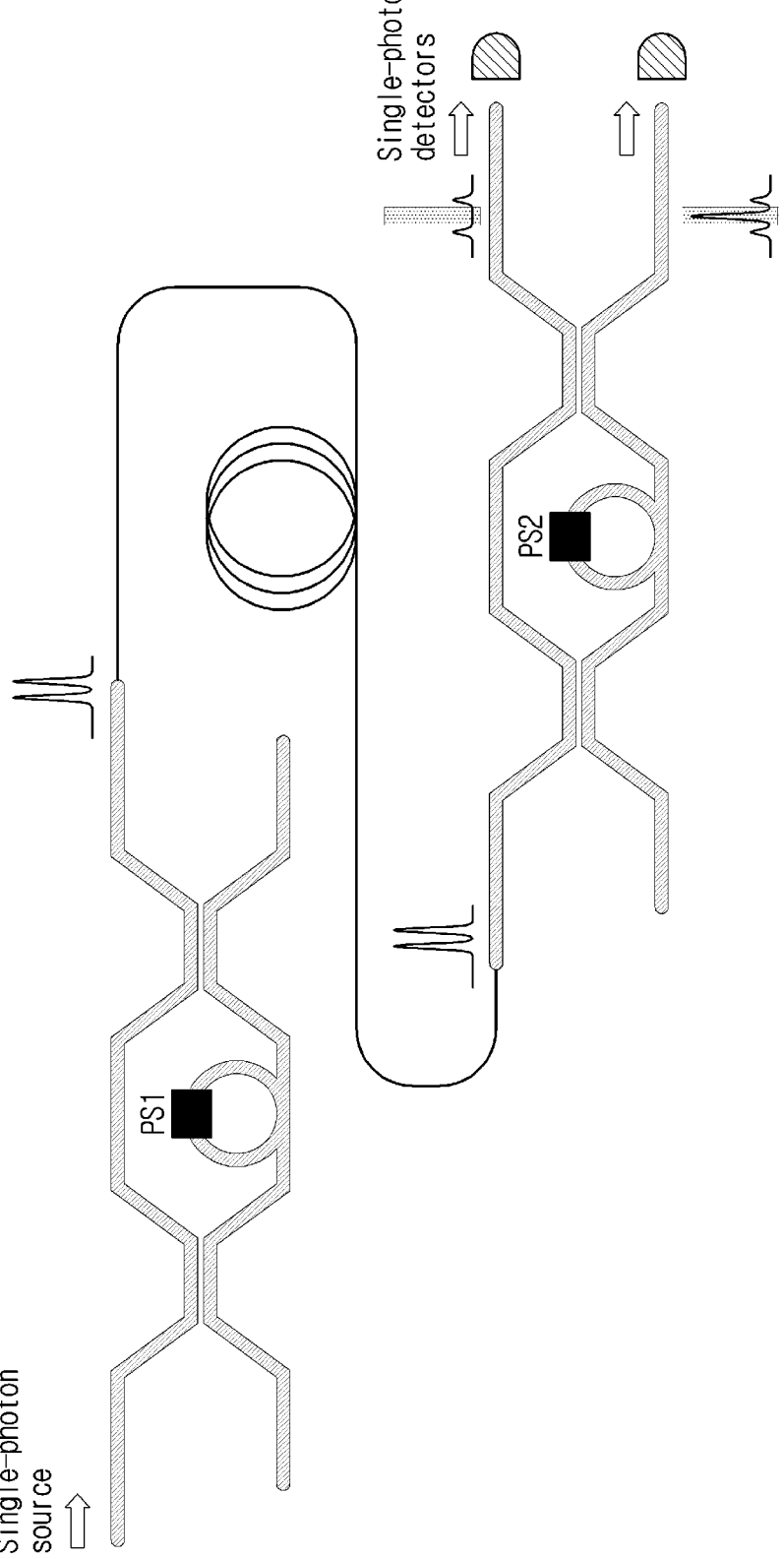
FIG. 3 shows a basic operation structure of a device for receiving and measuring a signal that is transmitted from a transmitting device.

FIG. 2 shows a basic operation structure of a device for encoding a single-photon pulse train generated at a time interval in a time-bin qubit and transmitting the time-bin qubit signal, and FIG. 3 shows a basic operation structure of a device for receiving and measuring a signal that is transmitted from a transmitting device.

Referring to FIG. 2, after a single-photon pulse train is divided into an upper and lower optical waveguides by a directional coupler (DC), an optical path delay line at the center region generates a time delay between qubit signals passing the upper and lower optical waveguides. Then, owing to asymmetric interferometer including two DCs and the optical path delay line, a time-bin superposition state of a single photon may be obtained by a time-modulated signal, in which a single-photon distribution is formed with two sections corresponding to $|0\rangle$ and $|1\rangle$ states, respectively, with a time difference shorter than a time interval of the single-photon pulse train. However, since this process cannot prevent a leak of a single-photon state via a bottom-right optical waveguide, an optical loss of ½ occurs.

FIG. 3 shows a basic structure of a system for receiving and measuring a time-bin qubit that is encoded through the process of FIG. 2 and is transmitted through an optical fiber line. After reaching a receiving end, qubit information in a time-bin superposition state passes through an asymmetric interferometer at the receiving end and then forms a new probabilistic interference pattern with respect to time. Herein, a signal for analyzing quantum information, encoded in a time-bin qubit at a transmitting end corresponds to a shaded part in the middle of a signal pattern transmitted to two single-photon detectors in FIG. 3. Thus a process of selecting and measuring the signal discards signals outside the shaded area. As the result, an additional probabilistic loss of ½ occurs, like at the transmitting end. For reference, although FIG. 3 describes a case in which a signal transmitted to a single-photon detector through a lower optical waveguide is maximized, the probabilistic distribution of signals, which are transmitted to the two single-photon detectors through the upper and lower optical waveguides, may be different according to an accumulated result of optical interference that occurs at a transmitting end and a receiving end. Nevertheless, information obtained from such measurement is nothing but a probability for each of the state of $|0\rangle$ or $|1\rangle$, which correspond respectively to values of $|\alpha|^2$ and $|\beta|^2$ for the general quantum state $|\psi\rangle = \alpha|0\rangle + \beta|1\rangle$ represented in FIG. 1, and hence the problem thus occurring is that information on a relative phase $\phi$ between the states of $|0\rangle$ and $|1\rangle$, or equivalently between $\alpha$ and $\beta$, is lost.

FIG. 2 and FIG. 3 described above treat only the case of a transmitting end system and a receiving end system for time-bin photonic qubit information. But in the case of a system where such unit modules are arranged in series and/or parallel, a cumulative probabilistic loss of respective modules becomes an exponential one like $\frac{1}{2}^n$ and thus the overall efficiency of system may be so drastically lowered as to make the system unavailable.

The main idea of the embodiments of the present disclosure is to provide an integrated measuring device capable of obtaining all the quantum information including a relative phase for a time-bin qubit of a single photon.

Furthermore, in the embodiments of the present disclosure, the overall efficiency of a system to which a photonic qubit technology is applied may be improved and the consumption of qubit resources and system resources may be minimized, by minimizing the probabilistic loss of single-photon qubit information that is generated in each stage including qubit encoding of a single photon, conversion of a qubit encoding scheme, and measurement of a single-photon state.

The embodiments of the present disclosure describe two spatial paths, wherein the spatial paths may include everything capable of transmitting a signal corresponding to single-photon qubit information such as an optical fiber and a planar optical waveguide.

Figure 4:
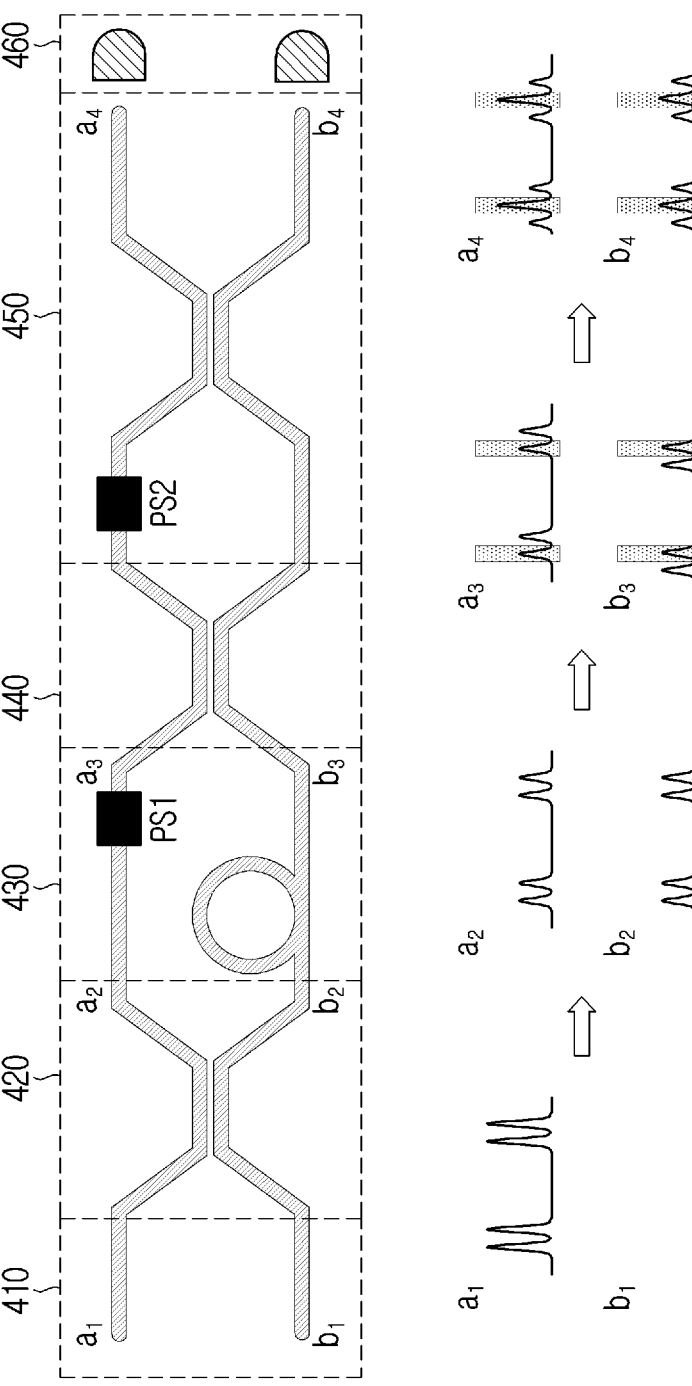
FIG. 4 shows a configuration of a device for processing and measuring a photonic qubit according to an embodiment of the present disclosure.

FIG. 4 shows a configuration of a device for processing and measuring a photonic qubit according to an embodiment of the present disclosure, wherein the configuration of the device is for soundly manipulating and measuring a quantum superposition state of a time-bin photonic qubit.

Referring to FIG. 4, a photonic qubit processing and measuring device according to an embodiment of the present disclosure includes a first optical unit 410, a second optical unit 420, a third optical unit 430, a fourth optical unit 440, a fifth optical unit 450, and a detection unit 460.

The first optical unit 410 receives and transmits a time-modulated signal, for example, $a_1$, which is divided into two sections that are distinguished with respect to time and correspond respectively to the states of $|0\rangle$ and $|1\rangle$ of single-photon qubit information.

The second optical unit 420 forms a first path-signal pattern by distributing a time-modulated signal into two spatial paths.

Herein, for example, the second optical unit 420 may form the first path-signal pattern by distributing the time-modulated signal into the two spatial paths by means of a directional coupler. In an embodiment of the present disclosure, a path-signal pattern may mean a pattern including both signals on two spatial paths, for example, a pattern including a signal transmitted through a first spatial path and a signal transmitted through a second spatial path. According to an embodiment, a first path-signal pattern may mean a signal pattern including both $a_2$ and $b_2$ of FIG. 4.

According to an embodiment, for example, the second optical unit 420 may form a first path-signal pattern by distributing a time-modulated signal into two spatial paths by means of a Y branch.

The third optical unit 430 forms a second path-signal pattern from a first path-signal pattern, that is, a signal pattern including both $a_3$ and $b_3$, by inducing a relative delay with a preset time interval and controlling a phase difference between signals on two spatial paths.

Herein, the third optical unit 430 may include a first optical means, which derives a relative delay between signals on two spatial paths with a preset time interval, for example, an optical path delay line, and a second optical means (PS1), which controls a phase change in a signal on at least one of the two spatial paths, for example, a phase shifter. In an embodiment of the present disclosure, the first optical means may derive a time delay by an interval between two sections in a time-modulated signal, and the second optical means may be configured as an optical means 2-1 that controls a phase change in a signal on a first spatial path of two spatial paths, that is, a phase shifter as illustrated in FIG. 4.

Furthermore, although not illustrated, a second optical means of the third optical unit 430 may further include an optical means 2-2, which controls a phase change in a signal of a second spatial path on two spatial paths, that is, a phase shifter. Herein, although with identical phase shifters, the phase shifter located in the second spatial path may be utilized to as a means to correct a phase difference between signals on the two spatial paths, which can occur due to an aging effect or a manufacturing error, or to complement a phase shifter located in the first spatial path in order to control a phase difference between signals on the two spatial paths with accuracy or within an optimal control range.

The fourth optical unit 440 forms a third path-signal pattern through optical interference of a second path-signal pattern.

Herein, the fourth optical unit 440 may include a first optical interference block in which optical interference occurs between signals on two respective spatial paths in the second path-signal pattern.

The fifth optical unit 450 controls a phase difference between signals on two spatial paths and forms a fourth path-signal pattern, for example, a signal pattern including both $a_4$ and $b_4$, through optical interference of a third path-signal pattern affected by a control result of phase difference.

Herein, the fifth optical unit 450 may include a third optical means (PS2), which controls a phase change in a signal on at least one of two spatial paths, for example, a phase shifter, and a second optical interference block in which interference occurs between signals on two spatial paths in a third path-signal pattern affected by the phase change due to a third optical means. In an embodiment of the present disclosure, a third optical means may be configured as an optical means 3-1 that controls a phase change in a signal on a first spatial path of two spatial paths, for example, a phase shifter.

Furthermore, although not illustrated, a third optical means of the fifth optical unit 450 may further include an optical means 3-2, which controls a phase change in a signal on a second spatial path of two spatial paths, that is, a phase shifter.

The detection unit 460 analyzes single-photon qubit information by measuring a fourth path-signal pattern.

Herein, the detection unit 460 may measure the shaded areas of the fourth path-signal pattern, for example, those in $a_4$ and $b_4$, and provide complete information on a state of single-photon qubit from a measurement result.

Specifically, in the device of FIG. 4, a time-bin qubit incident into the upper optical waveguide passes through a DC and an optical path delay line and then forms an optical interference condition between time-bin quantum states, and when it is subject to unitary transformation through a Mach-Zehnder interferometer structure including two phase shifters, for example, PS1 and PS2, a desired interference effect is obtained for shaded middle portions of output signals. In such a process, a measurement result may be obtained for a respective basis set of $|0\rangle$ and $|1\rangle$, $|+\rangle$ and $|-\rangle$, and $|+i\rangle$ and $|-i\rangle$ according to the phase control by PS1 and PS2, and thus a quantum state of a time-bin qubit received by the device may be wholly analyzed.

Figure 5:
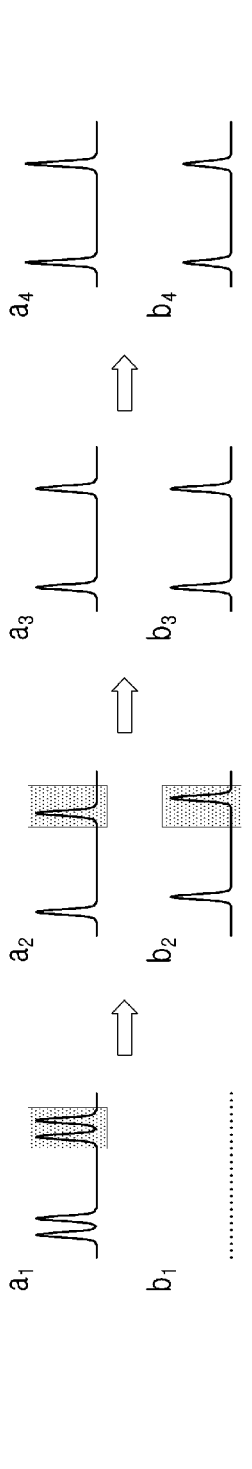
FIG. 5 shows a configuration of a device for processing and measuring a photonic qubit according to another embodiment of the present disclosure.

Like the case of FIG. 3, the structure of FIG. 4 also has the probabilistic loss of $\frac{1}{2}$ caused by a signal outside the shaded area in the time-bin measurement, and such a problem of probabilistic loss may be improved through FIG. 5.

FIG. 5 shows a configuration of a device for processing and measuring a photonic qubit according to another embodiment of the present disclosure, and the configuration of the device improves the problem of probabilistic loss that occurs during the measurement of a time-bin photonic qubit.

Referring to FIG. 5, a photonic qubit processing and measuring device according to another embodiment of the present disclosure includes a first optical unit 510, a second optical unit 520, a third optical unit 530, a fourth optical unit 540, a fifth optical unit 550, a sixth optical unit 560, and a detection unit 570.

The first optical unit 510 receives and transmits a time-modulated signal, for example, $a_1$, which is divided into two sections that are distinguished with respect to time and correspond respectively to the states of $|0\rangle$ and $|1\rangle$ of single-photon qubit information.

The second optical unit 520 forms a first path-signal pattern by distributing a time-modulated signal into two spatial paths.

Herein, for example, the second optical unit 520 may form the first path-signal pattern by distributing the time-modulated signal into the two spatial paths by means of a Y branch or a directional coupler.

The third optical unit 530 quickly controls a phase difference between signals on the two spatial paths within a shorter time than a time interval between two sections in a time-modulated signal, and distributes separately two states of single-photon qubit information, which is divided into each of the two sections in the time-modulated signal, into the two spatial paths respectively, through optical interference of a first path-signal pattern affected by a control result of the phase difference, thereby generating a second path-signal pattern, for example, a signal pattern including both $a_2$ and $b_2$.

Herein, the third optical unit 530 may include a first optical means, which is provided to at least one of the two spatial paths and quickly controls a phase difference between signals on the two spatial paths within a shorter time than a time interval between two sections in a time-modulated signal, for example, a high-speed phase shifter (HS-PS), and a first optical interference block in which optical interference occurs between signals on the two spatial paths in the first path-signal pattern affected by the phase difference control due to the first optical means.

The fourth optical unit 540 forms a third path-signal pattern, for example, a signal pattern including both $a_3$ and $b_3$, from a second path-signal pattern by inducing a relative delay with a preset time interval to a signal on one spatial path transmitting qubit information of a temporally preceding section of the two sections in a time-modulated signal, relative to a signal on the other spatial path.

Herein, the fourth optical unit 540 may include a second optical means, which induces a relative delay with a preset time interval to a signal on one spatial path, of the two spatial paths, transmitting qubit information of a temporally preceding section of two sections in a time-modulated signal, relative to a signal on the other spatial path, for example, an optical path delay line, and a third optical means (PS1), which controls a phase change in a signal on at least one of the two spatial paths, for example, a phase shifter. In an embodiment of the present disclosure, a second optical means may induce a time delay by the interval between the two sections in a time-modulated signal, and a third optical means may be configured as an optical means 3-1 that controls a phase change in a signal on a first spatial path of two spatial paths, that is, a phase shifter.

Furthermore, although not illustrated, a third optical means of the fourth optical unit 540 may further include an optical means 3-2, which controls a phase change in a signal on a second spatial path of two spatial paths, that is, a phase shifter. Herein, although with identical phase shifters, the phase shifter located in the second spatial path may be utilized to as a means to correct a phase difference between signals on the two spatial paths, which can occur due to an aging effect or a manufacturing error, or to complement a phase shifter located in the first spatial path in order to control a phase difference between signals on the two spatial paths with accuracy or within an optimal control range.

The fifth optical unit 550 forms a fourth path-signal pattern through optical interference of a third path-signal pattern.

Herein, the fifth optical unit 550 may include a second optical interference block in which optical interference occurs between signals on two respective spatial paths in the third path-signal pattern.

The sixth optical unit 560 controls a phase difference between signals on two spatial paths and forms a fifth path-signal pattern, for example, a signal pattern including both $a_4$ and $b_4$, through optical interference of a fourth path-signal pattern affected by a control result of phase difference.

Herein, the sixth optical unit 560 may include a fourth optical means (PS2), which controls a phase change in a signal on at least one of two spatial paths, for example, a phase shifter, and a third optical interference block in which interference occurs between signals on two spatial paths in a fourth path-signal pattern affected by the phase change due to the fourth optical means. In an embodiment of the present disclosure, a fourth optical means may be configured as an optical means 4-1 that controls a phase change in a signal on a first spatial path of two spatial paths, for example, a phase shifter.

Herein, although not illustrated, a fourth optical means of the sixth optical unit 560 may further include an optical means 4-2, which controls a phase change in a signal on a second spatial path of two spatial paths, that is, a phase shifter.

The detection unit 570 analyzes single-photon qubit information by measuring a fifth path-signal pattern.

Herein, the detection unit 570 may measure the fifth path-signal pattern, for example, $a_4$ and $b_4$, and thus provide complete information on a state of single-photon qubit from a measurement result.

That is, the device of FIG. 5 separates two sections of a time-bin qubit signal, which correspond respectively to the quantum states of $|0\rangle$ and $|1\rangle$, by applying a HS-PS in a first interferometer with Mach-Zehnder structure and then hands each of them over to upper and lower optical waveguides of a next stage respectively. Next, the signals on the upper and lower optical waveguides carrying separate time-bin quantum information are arranged with respect to time via an optical path delay line, and unitary transformation for a quantum state is applied to the signals by the same way described with FIG. 4. Thus, a quantum state of a time-bin qubit may be wholly analyzed under the condition of a desired basis set. In addition, in this case, as two time-bin states, which were separated in an input signal, are reunited and then reach single-photon detectors, the problem of ½ probabilistic loss, which was unavoidable in the device configurations of FIG. 2 to FIG. 4, may also be resolved.

The configurations of FIG. 4 and FIG. 5 are also applicable to entanglement measurement for two photons such as the Bell state measurement, and especially when the configuration of FIG. 5 is applied, a great advantage may be achieved with respect to system resource reduction and speed-up by resolving the problem of the measurement success probability given by ¼ that results from a product of respective probabilistic losses during time-bin measurement for each photon.

The above-described embodiments focus mainly on a configuration of a measuring device for time-bin photonic qubit, but the application scope of the technique described through the embodiments is not limited or restricted to measuring a time-bin qubit by converting it to a path qubit.

Instead of delivering quantum information by a path qubit converted from a time-bin qubit into single-photon detectors, by transmitting the quantum information to another optical circuit based on a path qubit, the application to any quantum information processing based on photonics technology such as quantum computing becomes possible. In addition, a path qubit may be converted to a time-bin qubit through a simple reverse process with an input end and an output end being exchanged with each other in the same device, and in this case, a probability distribution and a phase relation may also be freely changed between two sections of time bins so that a large degree of freedom can be provided in utilizing a time-bin qubit. That is, when the positions of an input end and an output end are exchanged in a device according to embodiments of the present disclosure, a measuring device for a time-bin qubit may also function as a transmitting device, for example, an encoding device.

Figure 6:
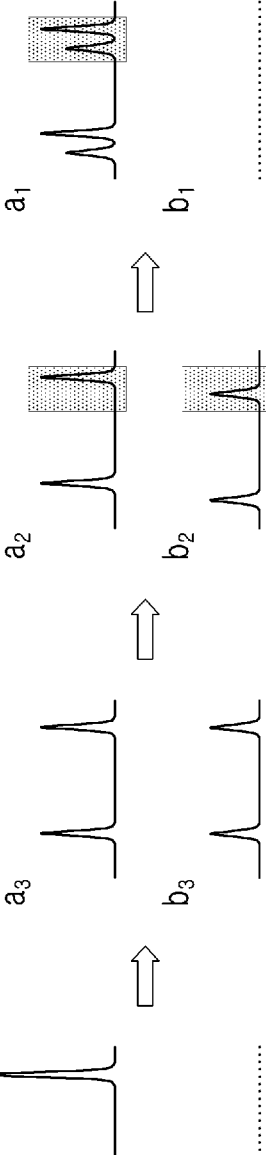
FIG. 6 is an example view for describing an operation of a device for encoding and transmitting a photonic qubit by means of the configuration of FIG. 5.

FIG. 6 is an example view for describing an operation of a device for encoding and transmitting a photonic qubit by means of the configuration of FIG. 5. The example view describes photonic qubit signal processing in the configuration of FIG. 5, where the single-photon detectors (detection unit) is excluded and a single-photon pulse train is input through a right end of an upper optical waveguide and is transmitted in a reverse direction.

As shown in FIG. 6, when a single-photon pulse train is input with a signal pattern including $a_4$ and $b_4$ of FIG. 5, a signal pattern including both $a_3$ and $b_3$ may be formed from a signal pattern including both $a_4$ and $b_4$, a signal pattern including both $a_2$ and $b_2$ may be formed from a signal pattern including both $a_3$ and $b_3$, and finally a signal pattern including both $a_1$ and $b_1$, that is, an encoded time-bin qubit signal may be formed from a signal pattern including both $a_2$ and $b_2$, through the functions of the above-described sixth optical unit, fifth optical unit, fourth optical unit, third optical unit, second optical unit, and first optical unit.

When such a scheme as in FIG. 6 is applied, it may become easy to encode time-bin qubits with any probability distribution and phase relation.

According to embodiments of the present disclosure, since the configuration and function of a device provide an effective means of converting time-bin qubit encoding of photon to path qubit encoding, or vice versa, the device may have an advantage of easily connecting the existing technology of quantum photonic integrated circuits, which has been rapidly developed in quantum computing fields, to quantum communication, and other great advantages may be achieved in integration, stabilization and fast processing. In particular, since phase shifters can be applied to all of the modulation operation, the problem of control time needed in mechanical operations of polarizer for processing polarization qubits may be solved so that there can be great advantages not only in ultraspeed quantum signal processing but also in securing the scalability of quantum networks and quantum interne that requires the Bell state measurement as in quantum teleportation and quantum swapping.

A device according to embodiments of the present disclosure may measure a time-bin photonic qubit with any basis set of a quantum state and thus obtain phase relation information as well as probability amplitudes for a superposed quantum state.

In addition, a device according to embodiments of the present disclosure may avoid the problem of probabilistic loss caused by time-bin qubit measurements and enable deterministic qubit conversion and unitary operation to be applied, thereby remarkably reducing resources in quantum communication and quantum computing.

In addition, a device according to embodiments of the present disclosure may have another advantage in circuit integration and high-speed quantum signal processing by providing an alternative means to the established polarization qubit technology that is most widely used to measure a quantum state.

Through technology provided in embodiments of the present disclosure, a time-bin photonic qubit can be converted to a path qubit and then be applied to a quantum photonic integrated circuit technique, and a reverse process may be applied to a same device configuration so that a path qubit can be converted to a time-bin qubit and thus the degree of freedom can be improved in using a quantum state of the time-bin qubit.

A method for processing a photonic qubit may be provided by using a device according to an embodiment of the present disclosure. For example, a method for processing a photonic qubit according to yet another embodiment of the present disclosure includes: receiving a time-modulated signal divided into two sections which are distinguished with respect to time and correspond respectively to the |0

⟩ and |1⟩ states of single-photon qubit information; forming a first path-signal pattern by distributing the time-modulated signal into two spatial paths; forming a second path-signal pattern from the first path-signal pattern by inducing a relative delay with a preset time interval and controlling a phase difference between signals on the two spatial paths; forming a third path-signal pattern through optical interference of the second path-signal pattern; and controlling a phase difference between signals on the two spatial paths and forming a fourth path-signal pattern through optical interference of the third path-signal pattern affected by a control result of the phase difference.

Herein, the forming of the second path-signal pattern may further include: controlling a phase difference between signals on the two spatial paths within a shorter time than a time interval between the two sections in the time-modulated signal; forming a fifth path-signal pattern by distributing the two states of the single-photon qubit information, which is divided into each of the two sections in the time-modulated signal, into the two spatial paths respectively, through optical interference of the first path-signal pattern affected by a control result of the phase difference; and forming the second path-signal pattern from the fifth path-signal pattern by inducing a relative delay with a preset time interval in a spatial path, to which qubit information of a temporally preceding section in the time-modulated signal is delivered, and by controlling a phase difference between signals on the two spatial paths.

Although not described in a method according to the yet another embodiment of the present disclosure, the method may include all the contents described in the devices of FIG. 2 to FIG. 6, which is apparent to those who have skill in the art.

While the exemplary methods of the present disclosure described above are represented as a series of operations for clarity of description, it is not intended to limit the order in which the steps are performed, and the steps may be performed simultaneously or in a different order as necessary. In order to implement the method according to the present disclosure, the described steps may further include other steps, may include remaining steps excluding some of the steps, or may include other additional steps with excluding some of the steps.

The various embodiments of the present disclosure are not a list of all possible combinations and are intended to describe representative aspects of the present disclosure, and the matters described in the various embodiments may be applied independently or in combination of two or more.

What is claimed is:

1. An apparatus for processing a photonic qubit signal, the apparatus comprising:

a first optical unit configured to receive and transmit a time-modulated signal divided into two sections which are distinguished with respect to time and correspond respectively to |0⟩ and |1⟩ states of single-photon qubit information;

a second optical unit configured to form a first path-signal pattern by distributing the time-modulated signal into two spatial paths;

a third optical unit configured to form a second path-signal pattern from the first path-signal pattern by inducing a relative delay with a preset time interval and controlling a phase difference between signals on the two spatial paths;

a fourth optical unit configured to form a third path-signal pattern through optical interference of the second path-signal pattern; and a fifth optical unit configured to control a phase difference between signals on the two spatial paths and to form a fourth path-signal pattern through optical interference of the third path-signal pattern affected by a control result of the phase difference.

2. The apparatus of claim 1, further comprising a detection unit configured to analyze the single-photon qubit information by measuring the fourth path-signal pattern.

3. The apparatus of claim 1, wherein the second optical unit is implemented by using a Y branch or a directional coupler.

4. The apparatus of claim 1, wherein the third optical unit comprises a first optical means that induces a relative delay between signals on the two spatial paths with a preset time interval, and a second optical means that controls a phase change in a signal on at least one spatial path of the two spatial paths, and wherein the first optical means is further configured to induce a time delay by a time interval between the two sections divided temporally in the time-modulated signal.

5. The apparatus of claim 4, wherein the second optical means comprises:

an optical means 2-1 configured to control a phase change in a signal on a first spatial path of the two spatial paths; and an optical means 2-2 configured to control a phase change in a signal on a second spatial path of the two spatial paths.

6. The apparatus of claim 1, wherein the fourth optical unit comprises a first optical interference block in which optical interference occurs between signals on the two spatial paths in the second path-signal pattern.

7. The apparatus of claim 1, wherein the fifth optical unit comprises:

a third optical means that controls a phase change in a signal on at least one spatial path of the two spatial paths; and a second optical interference block in which optical interference occurs between signals on the two spatial paths in the third path-signal pattern affected by the phase change due to the third optical means.

8. The apparatus of claim 7, wherein the third optical means comprises:

an optical means 3-1 configured to control a phase change in a signal on a first spatial path of the two spatial paths; and an optical means 3-2 configured to control a phase change in a signal on a second spatial path of the two spatial paths.

9. An apparatus for processing a photonic qubit signal, the apparatus comprising:

a first optical unit configured to receive and transmit a time-modulated signal divided into two sections which are distinguished with respect to time and correspond respectively to $|0\rangle$ and $|1\rangle$ states of single-photon qubit information;

a second optical unit configured to form a first path-signal pattern by distributing the time-modulated signal into two spatial paths;

a third optical unit configured to control a phase difference between signals on the two spatial paths within a shorter time than a time interval between the two sections in the time-modulated signal and to form a second path-signal pattern by distributing the two states of the single-photon qubit information, which is divided into each of the two sections in the time-modulated signal, into the two spatial paths respectively, through optical interference of the first path-signal pattern affected by a control result of the phase difference;

a fourth optical unit configured to form a third path-signal pattern from the second path-signal pattern by inducing a relative delay with a preset time interval in a spatial path, to which qubit information of a temporally preceding section of the two sections in the time-modulated signal is delivered, and by controlling a phase difference between signals on the two spatial paths;

a fifth optical unit configured to form a fourth path-signal pattern through optical interference of the third path-signal pattern; and a sixth optical unit configured to control a phase difference between signals on the two spatial paths and to form a fifth path-signal pattern through optical interference of the fourth path-signal pattern affected by a control result of the phase difference.

10. The apparatus of claim 9, further comprising a detection unit configured to analyze the single-photon qubit information by measuring the fifth path-signal pattern.

11. The apparatus of claim 9, wherein the third optical unit comprises:

a first optical means that is provided to at least one spatial path of the two spatial paths and controls a phase difference between signals on the two spatial paths within a shorter time than a time interval between the two sections in the time-modulated signal; and a first optical interference block in which optical interference occurs between signals on the two spatial paths in the first path-signal pattern affected by the phase difference control due to the first optical means.

12. The apparatus of claim 9, wherein the fourth optical unit comprises:

a second optical means that induces a relative delay with a preset time interval to a signal on one spatial path, of the two spatial paths, transmitting qubit information of a temporally preceding section of the two sections in the time-modulated signal, relative to a signal on the other spatial path; and a third optical means that controls a phase change in a signal on at least one spatial path of the two spatial paths.

13. The apparatus of claim 12, wherein the third optical means comprises:

an optical means 3-1 configured to control a phase change in a signal on a first spatial path of the two spatial paths; and an optical means 3-2 configured to control a phase change in a signal on a second spatial path of the two spatial paths.

14. The apparatus of claim 9, wherein the fifth optical unit comprises a second optical interference block in which optical interference occurs between signals on the two spatial paths in the third path-signal pattern.

15. The apparatus of claim 9, wherein the sixth optical unit comprises:

a fourth optical means that controls a phase change in a signal of a first spatial path of the two spatial paths; and a third optical interference block in which optical interference occurs between signals on the two spatial paths in the fourth path-signal pattern affected by the phase change due to the fourth optical means.

16. The apparatus of claim 15, wherein the fourth optical means comprises:

an optical means 4-1 configured to control a phase change in a signal on a first spatial path of the two spatial paths; and an optical means 4-2 configured to control a phase change in a signal on a second spatial path of the two spatial paths.

17. A method for processing a photonic qubit signal, the method comprising:

receiving a time-modulated signal divided into two sections which are distinguished with respect to time and correspond respectively to $|0\rangle$ and $|1\rangle$ states of single-photon qubit information;

forming a first path-signal pattern by distributing the time-modulated signal into two spatial paths;

forming a second path-signal pattern from the first path-signal pattern by inducing a relative delay with a preset time interval and controlling a phase difference between signals on the two spatial paths;

forming a third path-signal pattern through optical interference of the second path-signal pattern; and controlling a phase difference between signals on the two spatial paths and forming a fourth path-signal pattern through optical interference of the third path-signal pattern affected by a control result of the phase difference.

18. The method of claim 17, further comprising analyzing the single-photon qubit information by measuring the fourth path-signal pattern.

19. The method of claim 17, wherein the forming of the second path-signal pattern comprises:

controlling a phase difference between signals on the two spatial paths within a shorter time than a time interval between the two sections in the time-modulated signal;

forming a fifth path-signal pattern by distributing the two states of the single-photon qubit information, which is divided into each of the two sections in the time-modulated signal, into the two spatial paths respectively, through optical interference of the first path-signal pattern affected by a control result of the phase difference; and forming the second path-signal pattern from the fifth path-signal pattern by inducing a relative delay with a preset time interval in a spatial path, to which qubit information of a temporally preceding section of the two sections in the time-modulated signal is delivered, and by controlling a phase difference between signals on the two spatial paths.

\* \* \* \* \*